United States Patent

Beakes et al.

[11] Patent Number: 5,186,405
[45] Date of Patent: Feb. 16, 1993

[54] PROGRAMMABLE LEAD PULL METHOD AND APPARATUS FOR USE WITH A STATOR WINDING MACHINE

[75] Inventors: John M. Beakes, Fairborn; Mark T. Heaton, Springfield, both of Ohio

[73] Assignee: Globe Products Inc., Huber Heights, Ohio

[21] Appl. No.: 589,443

[22] Filed: Sep. 27, 1990

[51] Int. Cl.⁵ .................. B65H 81/06; H01F 5/04
[52] U.S. Cl. ........................ 242/1.10 R; 29/605
[58] Field of Search ............ 242/1.1 R, 1.1 A, 1.1 E; 29/605, 596

[56] References Cited

U.S. PATENT DOCUMENTS

| | | | |
|---|---|---|---|
| 3,812,570 | 5/1974 | Mason | 29/205 D |
| 3,881,238 | 5/1975 | Mason | 29/205 D |
| 4,074,418 | 2/1978 | Pearsall | 29/596 |
| 4,951,379 | 8/1990 | Clemenz | 29/597 |
| 4,997,138 | 3/1991 | Luciani et al. | 242/7.03 |

OTHER PUBLICATIONS

Page from Brochure titled "Globe Automatic Stator Assembly", showing HSWTC-3100 Stator Winder published 1986 by Statomat-Globe, Inc. Front and Back pages included.

Primary Examiner—Katherine Matecki
Attorney, Agent, or Firm—Roger S. Dybvig

[57] ABSTRACT

A stator winding machine has a turret plate mounted for rotation about a vertical axis with stator clamp mechanisms mounted at spaced locations around its periphery for clamping stators to the turret plate with the axes of the stators coplanar with the axis of reciprocation and oscillation of the winding shuttle used to wind coils on the stators. The turret plate is repeatedly indexed in one direction about its vertical center axis to repeatedly sequentially move each of the stator clamp mechanisms to a load/unload station, an optional idle station, a winding station, a coil lead terminating station, and then back to the load/unload station. Parts of the machine are quickly replaceable and other parts are programmably adjustable to accommodate different stator configurations. The programmably adjustable parts include a lead pull assembly having wire grippers mounted on carriages driven in respectively opposite directions along planes that a perpendicular to the axis of reciprocation and oscillation of the winding shuttle by a programmably controlled drive motor. Air actuators on carriage are used to pivot the wire grippers and to control the vertical spacing of the wire grippers.

7 Claims, 7 Drawing Sheets

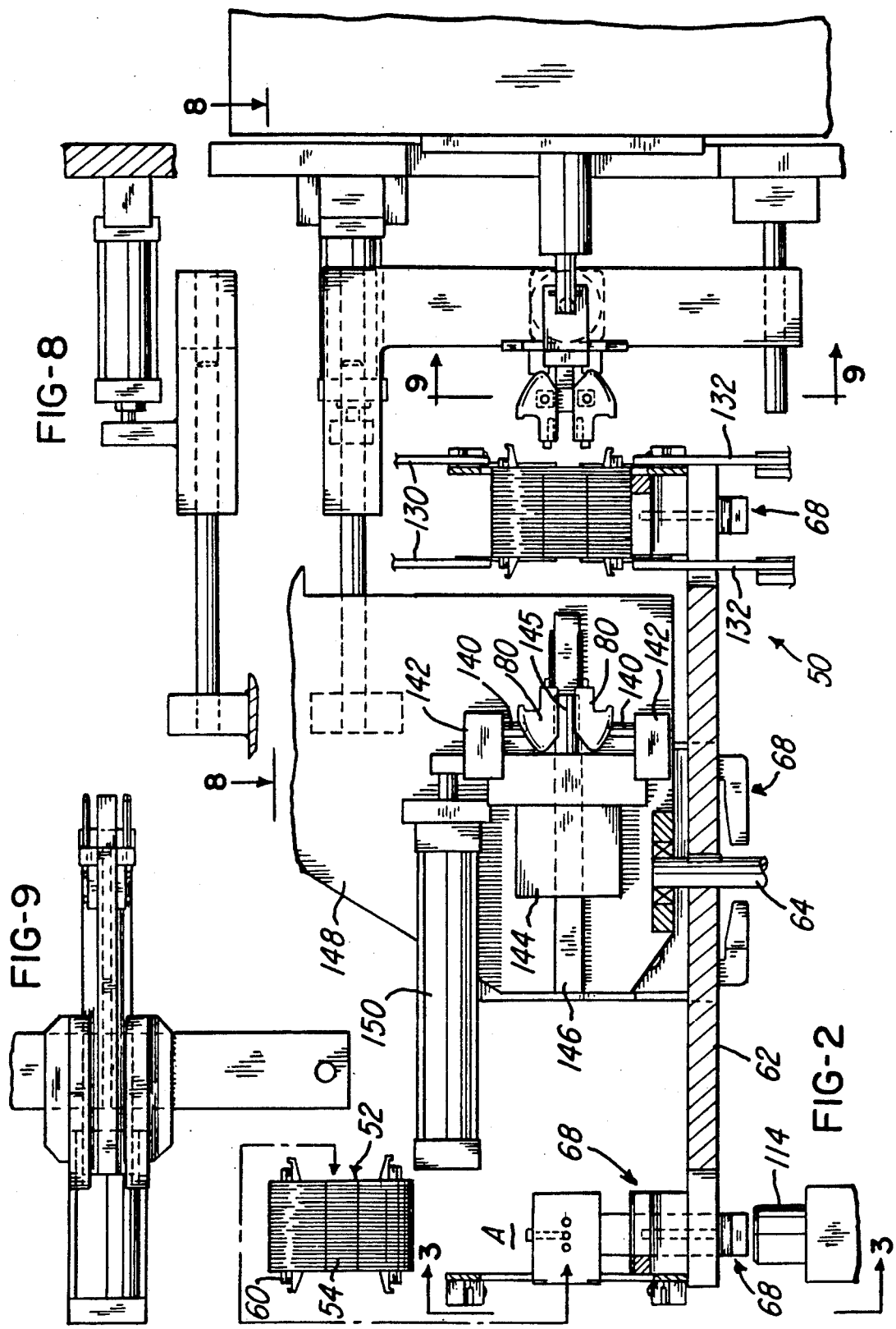

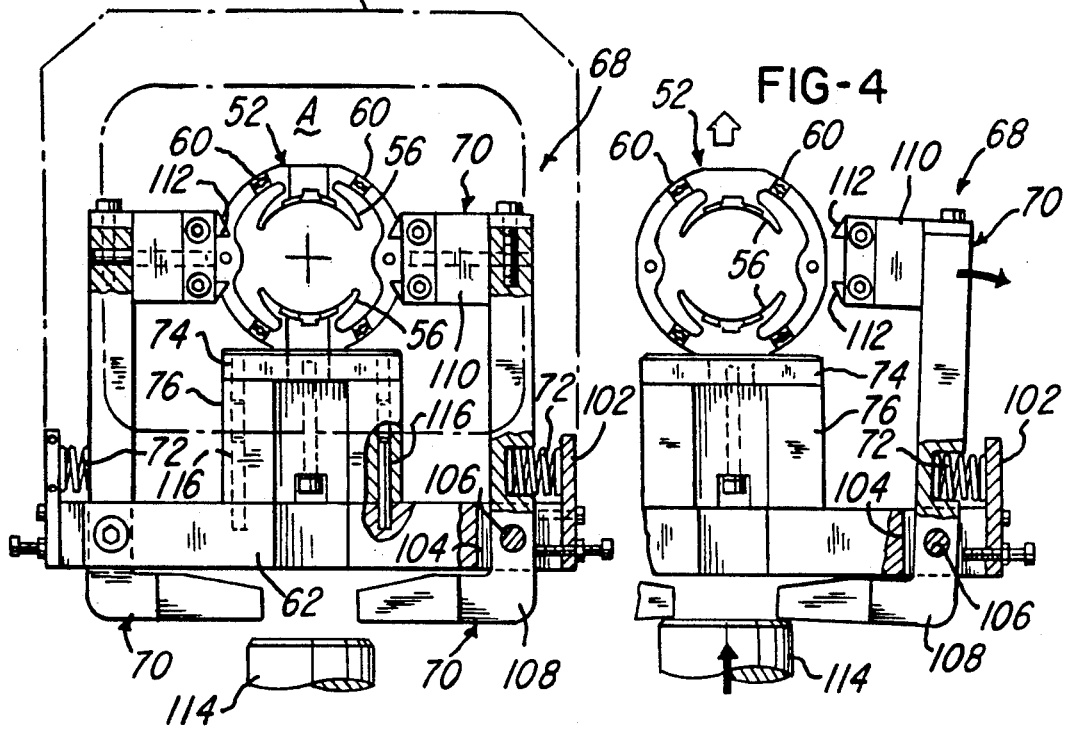
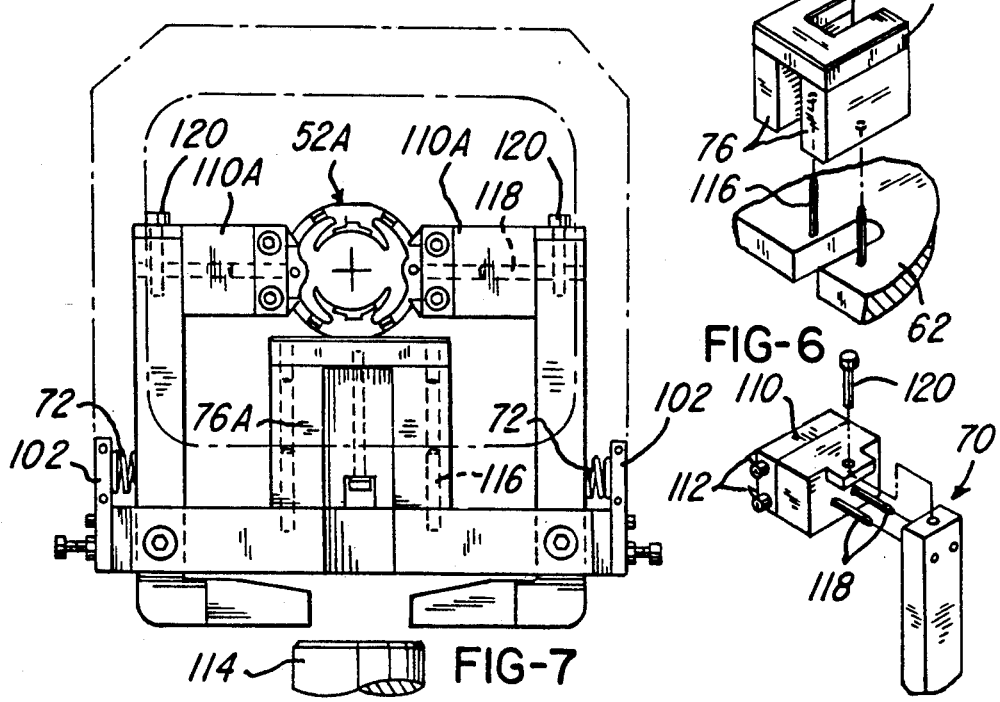

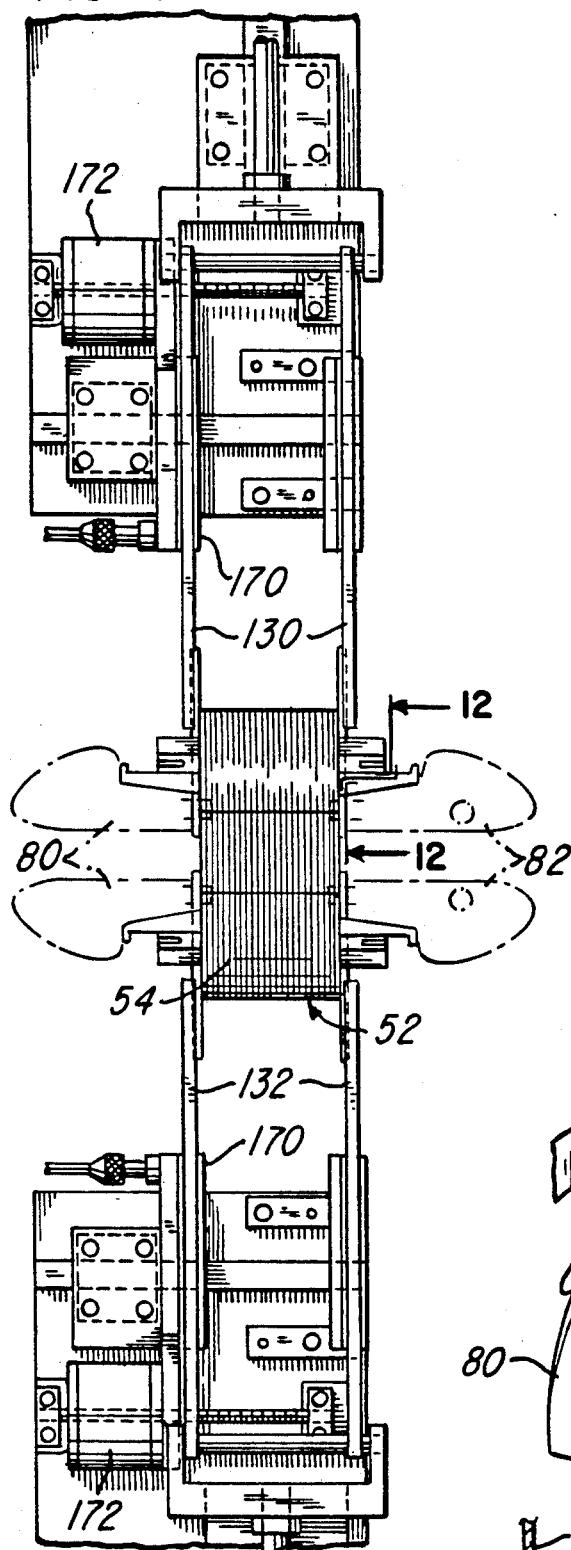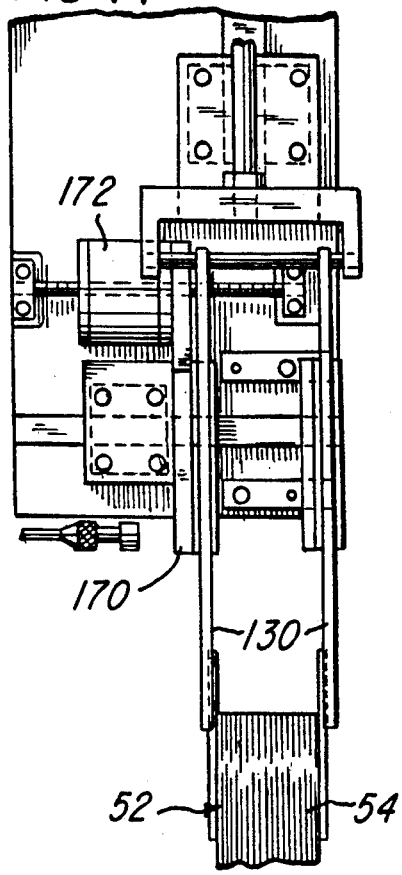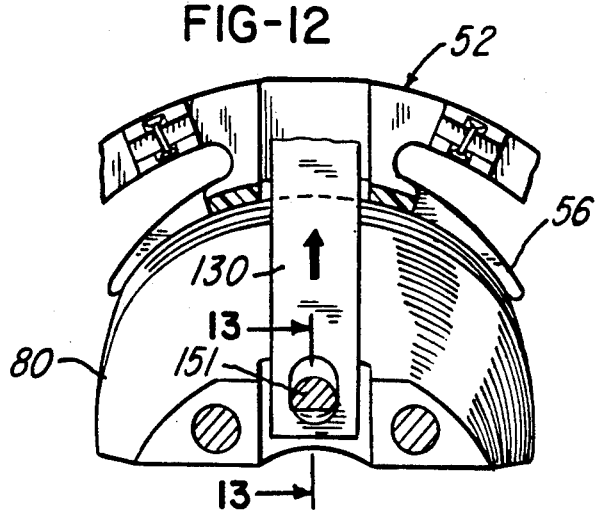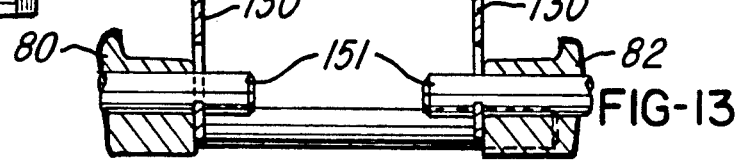

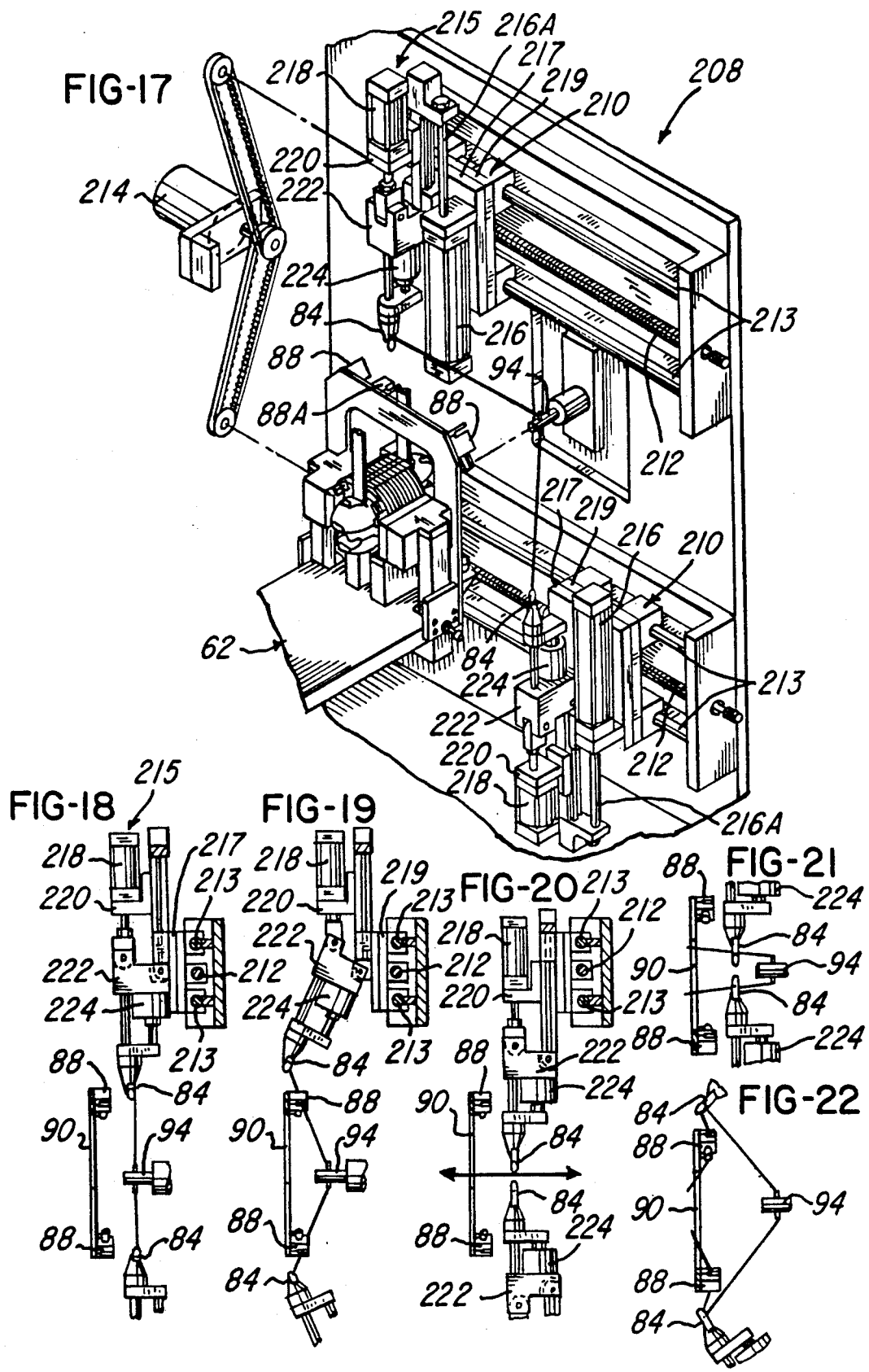

PROGRAMMABLE LEAD PULL METHOD AND APPARATUS FOR USE WITH A STATOR WINDING MACHINE

CROSS REFERENCE TO RELATED APPLICATION

This application, is a continuation in part of application Ser. No. 07/587937 filed Sep. 25, 1990 titled STATOR WINDER METHOD AND APPARATUS filed in U.S. Patent and Trademark Office on Sep. 25, 1990 by John M. Beakes, Gary E. Clemenz, Patrick A. Dolgas, Mark T. Heaton, Lawrence E. Newman.

BACKGROUND OF THE INVENTION

This invention relates to a programmable lead pull method and apparatus for use with a stator winding machine and particularly for use with stator winding machines used to wind field coils, especially for 2-pole stators.

In the manufacture of 2-pole stators, a common practice is to position a stator to be wound in a winding station with its longitudinal axis aligned with the axis of oscillation and reciprocation of a winding shuttle that draws wires from sources of wire under tension and winds the wires into coils around the stator pole pieces. There are typically four wire clamps located in fixed relation to the stator being wound into which the stator start and finish leads are inserted by a lead pull assembly that includes a pair of wire grippers, one being associated with each stator coil. In operation, after a stator is wound, the wire clamps are moved with the freshly wound stator out of the winding station and the wire grippers, which remain in the area of the winding station, hold the free ends of the wires exiting from the winding shuttle in predetermined positions. After the next unwound stator to be wound is located in the winding station, and often after the winding of coils on the unwound stator is commenced, the lead pull grippers are manipulated by mechanical means to insert the wire ends gripped by them into a pair of the wire clamps fixed relative to the unwound stator.

After the coils are fully wound, the wire grippers are again manipulated, this time to clampingly engage the segments of the wires extending from the newly wound coils to the winding shuttle and to insert the wire segments into another pair of wire clamps fixed relative to the freshly wound stator. In some cases the coils have tap leads in addition to the start and finish leads. In the past, the wire grippers have been used to pull the tap leads, but the tap leads were normally pulled out of the way and not securely clamped, the wire clamps normally being used only for the start and finish coil leads.

Older stator winding machines were typically dedicated to the winding of stators having but one configuration or a narrow range of configurations. In order to be used to wind stators having differing configurations, costly and time-consuming retooling or other changeover steps had to be taken. There is an ever increasing need to provide stator winding machines capable of being rapidly and inexpensively set up to wind stators of various different configurations. There is also a continuous need for improvements in the simplicity, cost, speed of operation, and reliability of stator winding machines. Of course, the same needs apply to lead pull apparatus. In addition, lead pull assemblies must also be sufficiently compact that they do not interfere with the other functions of the stator winding machine with which they are used. Compactness is an important factor, particularly because there is a usually a small space in the area of the winding head and the stator being wound within which a lead pull assembly is located.

An object of this invention is to provide a lead pull method and apparatus for use with a stator winding machine which is flexible so that it can be quickly set up for use with stators of various different configurations and which also meets the foregoing criteria of simplicity, low cost, high operating speeds, high reliability, and compactness.

In accordance with this invention a lead pull assembly is provided which comprises a pair of wire grippers, one for each of the stator coils, mounted on a pair of carriages that are supported for movement along mutually spaced and parallel paths located, respectively, above and below, the axis of oscillation and reciprocation of a winding shuttle. (Here it should be noted that relative terms such as "above", "below", "front", and "rear" are used in a relative and not an absolute sense herein unless the context indicates otherwise.) The carriages are driven back and forth along their respective paths in mutually opposite directions by a drive motor connected by timing belts to a pair of drive screws, one for each of the carriages. The wire grippers are mounted on the carriages by a first frame immovably affixed to its carriage and a second frame pivotally mounted on said first frame that may be pivoted about an axis parallel to the axis of movement of the carriage by operation of an air actuator mounted on the first frame. A second air actuator mounted on the pivotal frame opens and closes the wire gripper jaws and may also operate a cutting blade in a manner known in the art.

The lead pull apparatus of this invention is disclosed as part of a stator winding machine having a turret plate mounted for rotation about a vertical axis extending centrally therethrough, and plural stator clamp mechanisms mounted at spaced locations around the periphery of the turret plate, each of which mechanisms clamps a stator to the turret plate. For reasons which will become apparent, each stator is clamped to the turret plate with its center axis extending horizontally and substantially perpendicularly with respect to the vertical axis of rotation of the turret member and with the end face of the stator most remote from the vertical axis of the turret plate held in a vertical orientation spaced a fixed horizontal distance from such vertical axis. The stator is positioned on a seat adjacent each of the clamp mechanisms which may include a replaceable spacer for positioning the clamped stators at a proper height.

A wire clamp assembly is mounted on the turret plate adjacent each of the stator clamp mechanisms. Each wire clamp assembly preferably has programmable, air operated wire clamps adapted to temporarily hold coil lead wires extending from coils wound on a stator being wound.

The turret member is repeatedly indexed in one direction about its vertical center axis to repeatedly sequentially move each of the stator clamp mechanisms to a load/unload station, a winding station, a coil lead terminating station, and then back to the load/unload station. In the presently preferred embodiment, the turret has four stator clamp mechanisms, located 90 degrees apart around the periphery of the turret plate, one for each of the above-mentioned stations and an additional one which is accommodated by an idle station between the load/unload station and the winding station. However, it would be possible to utilize a 3 station turret plate in a winding machine which would not have an idle station.

At the load/unload station, a newly wound stator is removed from the turret plate and replaced by an unwound stator. Subsequently, the unwound stator is moved by an index of the turret plate to the winding station. Located adjacent the winding station is a winding head having a winding shuttle or ram that reciprocates and oscillates about a fixed horizontal axis to draw two or more wires from sources of wire under tension to wind the wires into coils about the stator poles. In advance of the operation of the winding head, two pairs of winding forms are connected to the unwound stator at the winding station, and a pair of wires extending from the wire sources and held by wire grippers are inserted by movement of the wire grippers into a pair of the wire clamps supported on the turret plate. Coils of wire are then wound on the unwound stator by operation of the winding head. At the conclusion of the winding operation, the wire portions leading from the coils to the winding shuttle are gripped by the wire grippers to form coil finish lead wires extending from the coils, which are positioned in other wire clamps on the turret plate. Wire cutting mechanisms associated with the wire grippers cut the finish leads, now clamped to the turret plate, free from the wire grippers so that the newly wound stator is completely severed from the winding head. The stator may then be indexed by rotation of the turret plate to the wire terminating station at which the start and finish leads are removed from the wire clamps and at least temporarily connected to terminals on the stator by a robot or other suitable mechanism. Accordingly, when the newly wound stator arrives at the load/unload station, it may be simply unclamped from the turret plate and removed. The foregoing operations are repeated to continuously wind stators.

Preferably, in addition to the programmable control of lead pull assemblies of this invention, the stator clamp mechanisms and the stator seats and spacers are quickly replaceable to accommodate stators having different stack diameters, the winding form handling and locking mechanisms are capable of accommodating stators having different stack heights, and the winding head is programmably movable for accommodating stators having different stack heights.

Although the lead pull method and apparatus of this invention is especially advantageous for use with the stator winding machine described above and is further described below, it will be apparent that it may be used in various other stator winding machines.

Other objects and advantages will become apparent from the following description and the drawings.

BRIEF DESCRIPTION OF THE DRAWINGS

FIG. 2 is a simplified, fragmentary, front elevational view of the machine of FIG. 1 and showing an unwound stator in position to have coils wound therein and another unwound stator about to be clamped to the machine turret plate.

FIG. 3 is a fragmentary elevational view, with parts broken away and parts shown in cross section, of a stator support and clamp assembly forming part of the machine of FIG. 1 as viewed in the direction of arrows 3—3 of FIG. 2 and showing a wire clamp support holder associated therewith by broken lines.

FIG. 4 is a fragmentary elevational view, with parts broken away and parts shown in cross section, of a portion of the stator support and clamp assembly of FIG. 3.

FIG. 5 is a fragmentary, exploded perspective view of a portion of a stator support forming part of the support and clamp assembly of FIGS. 3 and 4.

FIG. 6 is a fragmentary, exploded perspective view of a portion of a stator clamp forming part of the support and clamp assembly of FIGS. 3 and 4.

FIG. 7 is a view similar to FIG. 3 showing the stator support and clamp assembly modified to support a stator of a different size.

FIG. 8 is a fragmentary top plan view, partly in cross section, of a portion of a winding form-loading mechanism of the machine of FIGS. 1 and 2 as viewed in the direction of arrows 8—8 of FIG. 2.

FIG. 9 is a fragmentary elevational view of another portion of the winding form-loading mechanism of the machine of FIGS. 1 and 2 as viewed in the direction of arrows 9—9 of FIG. 2.

FIG. 11 is a fragmentary, elevational view of a stator located in position to be wound and showing winding forms locked to the stator by upper and lower programmably adjustable form lock assemblies.

FIG. 12 is an enlarged, fragmentary cross sectional view taken along section line 12—12 of FIG. 11, with parts cut away, showing the manner in which a winding form is locked to a stator.

FIG. 13 is a fragmentary cross sectional view taken along section line 13—13 of FIG. 12 and on the same scale as FIG. 12.

FIG. 14 is a simplified, fragmentary, elevational view showing the upper form locking assembly adjusted for use with a stator having a different stack height.

FIG. 17 is a fragmentary perspective view of a programmably adjustable lead pull assembly forming part of the machine of FIGS. 1 and 2. A small portion of this assembly is shown diagrammatically in FIG. 1 and is not shown in FIG. 2 to avoid overcrowding of lines.

FIGS. 18 through 22 diagrammatically illustrate the initial and final steps in the sequence of operation of the programmably adjustable lead pull assembly of FIG. 17.

DETAILED DESCRIPTION

Figure 1:
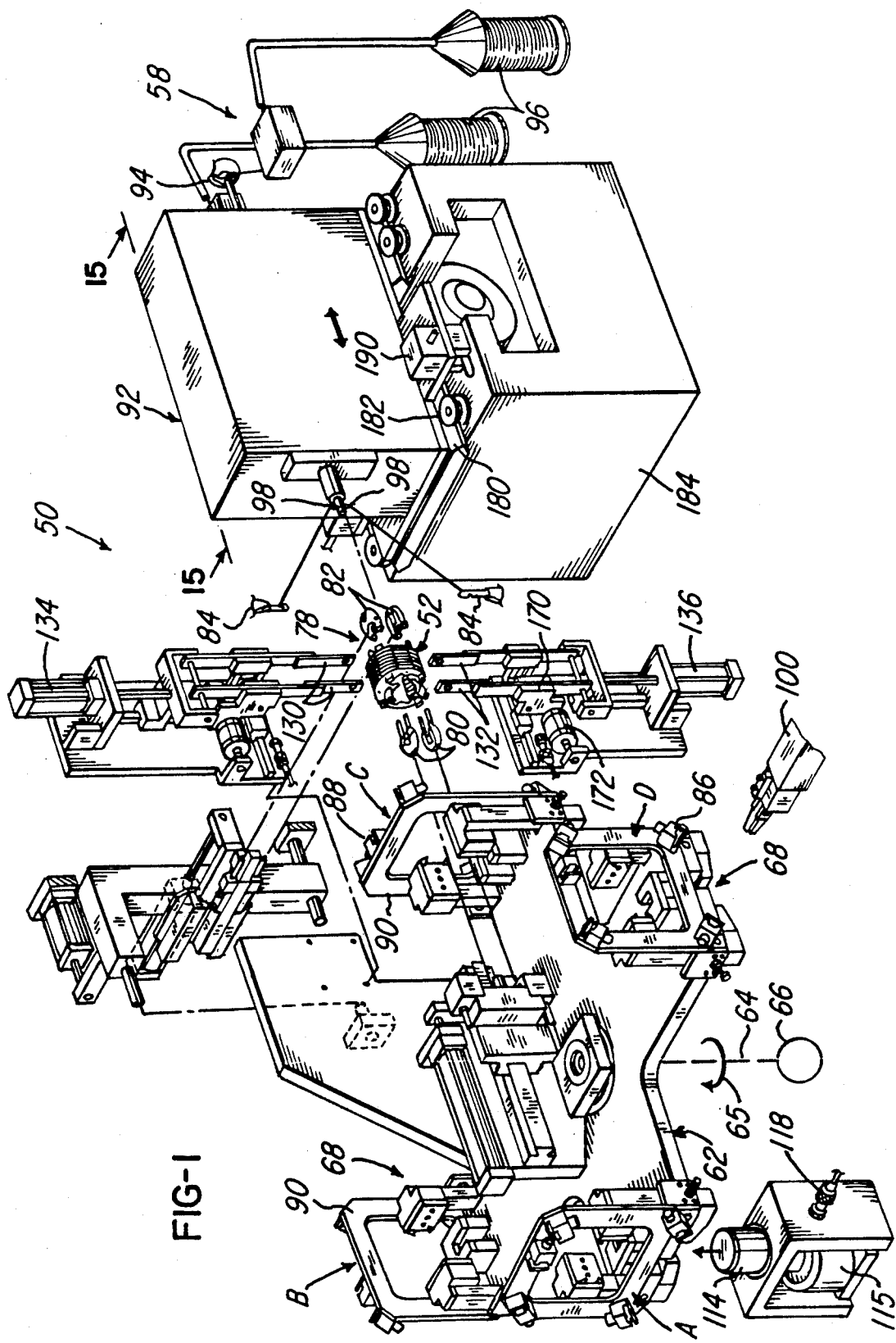
FIG. 1 is a simplified, exploded, partly diagrammatic perspective view of a stator winding machine that includes a lead pull assembly made in accordance with this invention. However, only the gripper portions of the lead pull assemblies are shown in FIG. 1.

FIGS. 1 and 2 illustrate a stator winding machine, generally designated 50, in accordance with this invention for use in winding coils of wire onto a 2-pole stator, generally designated 52, comprising a generally cylindrical laminated core 54 that forms pole pieces 56 about which the coils are wound from wires drawn from sources 58 of wire under tension. Here it may be observed that the length of a stator is known as its "stack height" since its length is determined by the number and thickness of the laminations from which it is formed. Its outer diameter is termed its "stack diameter". The stator 52 is also provided with terminal boards, which may be entirely conventional, and terminals 60 held by the boards to which the stator coil lead wires are connected.

In general, the purpose of the stator winding machine 50 is to wind field coils onto the stator pole pieces 56 and to at least temporarily connect the coil lead wires to the terminals on the stator.

With continued reference to FIGS. 1 and 2, the machine 50 includes a turret plate 62 mounted for rotation about a vertical axis 64 and repeatedly rotationally indexed through successive 90 degree increments in one direction, as indicated by the arrow 65 in FIG. 1, about its vertical axis 64 by a suitable indexing drive motor 66. Stators to be wound are clamped to an individual one of four stator clamp mechanisms, generally designated 68, each of which includes a pair of mutually confronting stator clamps, generally designated 70, pivotally mounted on the periphery of the turret plate 62 and biased by springs 72 into clamping engagement with the stators clamped thereby. The stators are supported by seats 74 located around the periphery of the turret plate 62. Spacers 76 to which the seats 74 are connected in any suitable fashion are provided, if needed, to locate the stators at the proper height with the longitudinal axis of the stator coplanar with the horizontal axis of movement of the winding shuttle, as will become apparent.

The four stator clamp mechanisms 68 are connected to the turret plate 62 at 90 degree spaced locations so that, in operation, after each 90 degree index of the turret plate 62, there will be a clamp mechanism 68 at each of four stations, namely a load/unload station A, an idle station B, a winding station C, and a coil lead terminating station D. At each of the stations, the stators are positioned with their center axes extending horizontally and substantially perpendicularly with respect to the vertical axis 64 of the turret plate 62 and with the end faces of the stators most remote from the vertical axis 64 in vertical orientations and spaced a fixed horizontal distance from the vertical axis 64 of the turret plate 62.

At the load/unload station A, a newly wound stator 52 is unclamped from the turret plate 62, removed from the turret plate 62, and replaced by an unwound stator 52. No operations are performed on the stator at the idle station B. At the winding station C, two pairs of winding forms 78, namely a pair of upper and lower front winding forms 80 and a pair of upper and lower rear winding forms 82, are connected to the unwound stator 52, and wire portions held by an upper and lower pair of wire grippers 84 are inserted by movement of the wire grippers 84 into a pair of the wire clamps 88 supported on the turret plate 62 by a mounting frame plate 90, as will be further described below.

After the foregoing steps are accomplished, a pair of stator coils are wound by the operation of a winding head 92 located adjacent the winding station C and having a reciprocating and oscillating shuttle or ram 94 that draws wires from sources 96 of wire under tension and having wire guide needles 98 through which the wires exit as the coils are wound. The operating mechanism within the winding head may be entirely conventional so it is not described in detail herein, its importance being that it causes the winding shuttle or ram 94 to reciprocate and oscillate about a fixed horizontal axis in order to wind coils of wire around the stator pole pieces in a manner well known in the art.

At the conclusion of the winding operation, the wire portions leading from the coils to the winding shuttle 94 are gripped by the wire grippers 84 to form coil finish lead wires extending from the coils, which are positioned in other ones of the wire clamps 88. Wire cutting mechanisms associated with the wire grippers 84 cut the finish leads free from the wire grippers so that the newly wound stator is completely free from the winding shuttle 94 so that the wound stator may be indexed by rotation of the turret plate 62 to the wire terminating station D at which the start and finish leads are removed from the wire clamps 86 and at least temporarily connected to terminals on the stator by a robot or other suitable mechanism, diagrammatically indicated at 100. This mechanism may also be conventional and is not further described herein. One example of a coil terminating mechanism is shown in U.S. Pat. No. 4,951,379. Thus it may be seen that when the newly wound stator returns to the load/unload station A, it may be simply unclamped from the turret plate and removed. The foregoing operations are repeated to continuously wind stators.

With reference to FIGS. 1 through 6, each clamp mounting plate 90 comprises a rectangular plate connected to a pair of spring retainer plates 102, each of which is mounted on the turret plate 62 over a recess 104 therein which is spanned by a pivot pin 106 for an L-shaped clamp lever 108 that forms part of one of the stator clamps 70. Each clamp 70 further includes a clamp jaw 110 removably connected to the clamp lever 108 shaped to engage the outer periphery of the stator. Each clamp jaw 110 has a pair of protuberant teeth 112 having vertical surfaces which provide reference points or backup surfaces engaged by the face of the stator most remote from the vertical axis 64 to insure that the stator is properly spaced from the operating mechanisms at the various stations. The stator may be so positioned by hand or by the use of a suitable mechanism, such as an industrial robot (not shown). To enable the stator to be inserted and removed through the clamp mounting plate 90 at the load/unload station A, the clamp jaws are spread apart by engagement of the piston 114 of an air cylinder 115 with the lower leg of the L-shaped clamp lever 108, as apparent from an inspection of FIGS. 1-3. A sensing switch 118 (FIG. 1) indicates to the machine controls that it is safe to index. The operations of this and various other sensing devices are not described herein, the use of such devices in the control of machine operations being well known.

As seen in FIGS. 5 and 6, the assembled seats 74 and spacers 76 and the stator clamp jaws 110 are readily removable and replaceable for use in supporting stators having different stack diameters. Thus, an assembled seat 74 and spacer 76 can simply be lifted off the turret plate 62, it being held only by a pair of pins 116 on the turret. The stator clamp jaw 110 shown in FIG. 6 is similarly slidable off the clamp lever 108 following removal of a retaining pin 120. The advantage of these quick-change parts can be observed by a comparison of FIGS. 3 and 7. Thus, FIG. 3, shows a relatively larger stator 52 and FIG. 7 shows a relatively smaller stator, designated 52A. FIG. 7 accordingly has a correspondingly taller spacer, designated 76A, and longer clamp jaws, designated 110A. It will be noted in FIGS. 3 and 7 that the stators are located on the same center line.

The winding of an unwound stator 52 commences with placement of the stator on the seat 74 located at the load/unload station A. This places the stator in a proper rotational orientation for further processing in view of the fact that the stator has a flat surface which rests on the seat 74. Of course, other means of stator orientation could be used. After the second subsequent index of the turret plate 62, the unwound stator arrives at the winding station C with its center line aligned with the fixed axis of reciprocation and oscillation of the winding shuttle 94. At this time the winding forms 80 and 82 are locked to one another and to the stator core 54 in an essentially conventional fashion. Thus, an upper pair of form retainer blades 130 are moved downwardly and a lower pair of form retainer blades 132 are moved upwardly by the operation of air actuators 134 and 136, respectively, into straddling relation to the stator core 54. It is appropriate to note at this time that the stator seat 74 and its spacer 76 are shaped to permit the extension of the lower form retainer blades therethrough or therepast.

Figure 10:
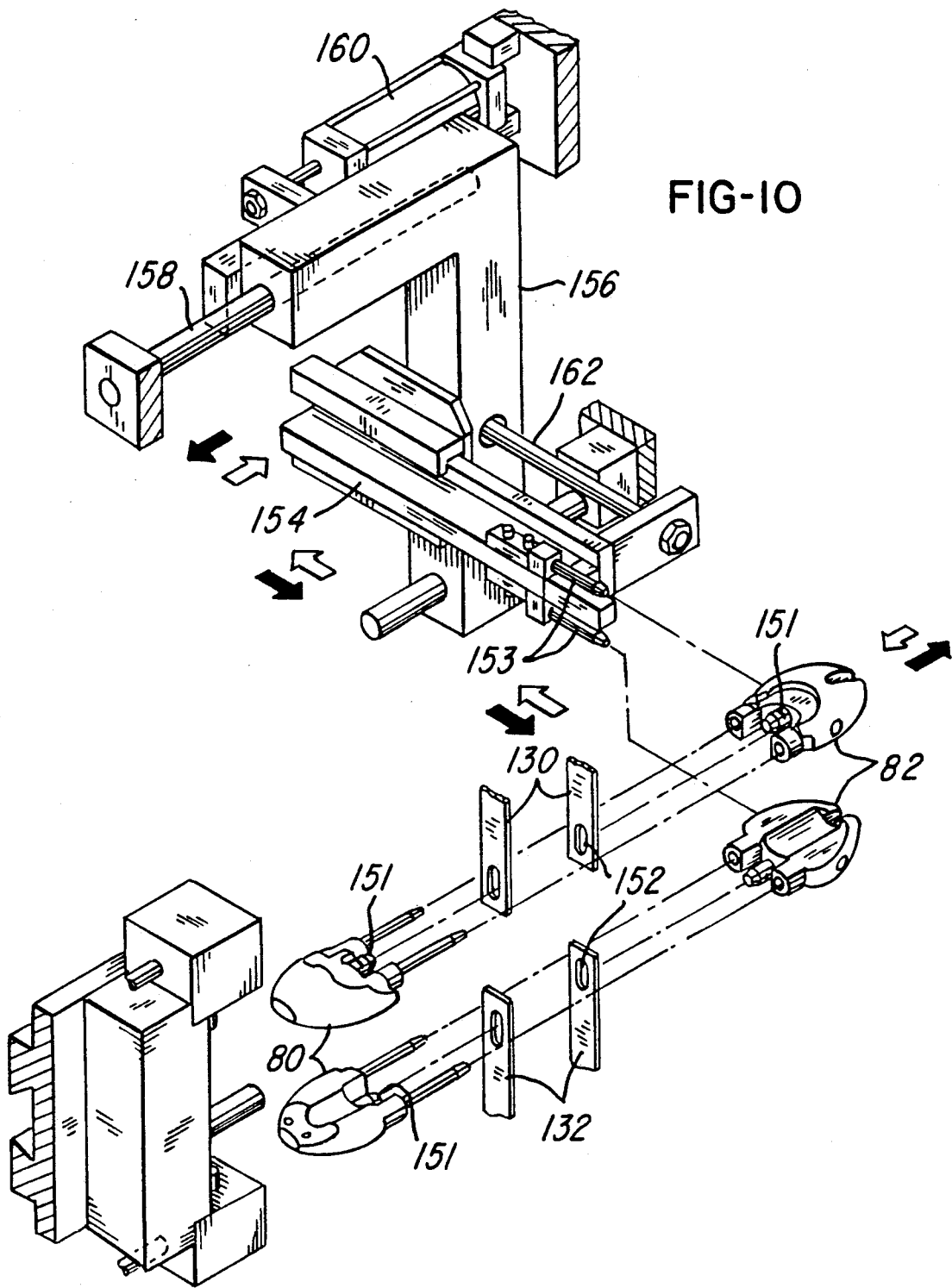
FIG. 10 is a simplified, fragmentary, exploded, perspective view that diagrammatically illustrates the movements of the various parts of the winding form-loading mechanism. The stator is not shown in FIG. 10 to avoid a confusion of lines.

With reference to FIGS. 2 and 10, the front pair of winding forms 80 are initially held between short piston rods 140 controlled by air cylinders 142 mounted on a carriage 144 and a center post 145 on the carriage 144. The carriage 144 is slidably guided along a gib 146 mounted on a mounting plate 148 affixed to the bed of the machine. The carriage 144 is movable toward and away from the stator at the winding station C by operation of an air actuator 150 that is also mounted on the fixed mounting plate 148. Advancement of the carriage 144 toward the stator causes the front winding forms to engage the front face of the stator core at which time a locking pin 151 on the front winding forms 80 pass through slots 152 in the form retainer blades 130 and 132. The rear pair of winding forms 82 is then advanced toward the stator and interengages with the front winding forms 80. The form retainer blades 130 and 132 are then moved away from the axis of the stator to lock the winding forms 80 and 82 to the stator core 54 by engagement with the locking pins, as well known.

The parts that carry the winding forms 80 and 82 to the stator are now moved away to enable the coil lead connection and the coil winding operations to commence. The carriage 144 for the front winding forms is simply retracted out of the way by operation of the air actuator 150. With reference to FIGS. 8, 9, and 10, the rear winding forms are carried by support pins 153 mounted on a pin carriage 154 movably mounted on an L-shaped bracket 156 slidable on guide rod 158 in a direction generally parallel to the stator axis and moved therealong by an actuator 160. The pin carriage 154 is driven relative to the bracket 156 by an air actuator 162 thereon. In operation, the support pins 153 are advanced to bring the rear winding forms toward the stator by operation of the air actuator 160. After the forms are locked to the stator, the pin carriage is retracted to the side by operation of the air actuator 162 and then rearwardly by operation of the air actuator 160 where the parts are out of the way to permit the coil lead handling and winding operations to take place. The operations to remove the winding forms 80 and 82 after the winding operation is completed will be obvious from the foregoing.

With reference to FIGS. 1, 11, and 14, the frontmost ones of the upper and lower form locking blades 130 and 132 are mounted on movable carriages 170 driven by motors 172 that enable them to be programmable adjusted for use with stators having different stack heights. Of course, the positions of the rear locking blades are fixed because the corresponding face of the stator is always located in the same vertical plane regardless of the stator stack height.

Figure 15:
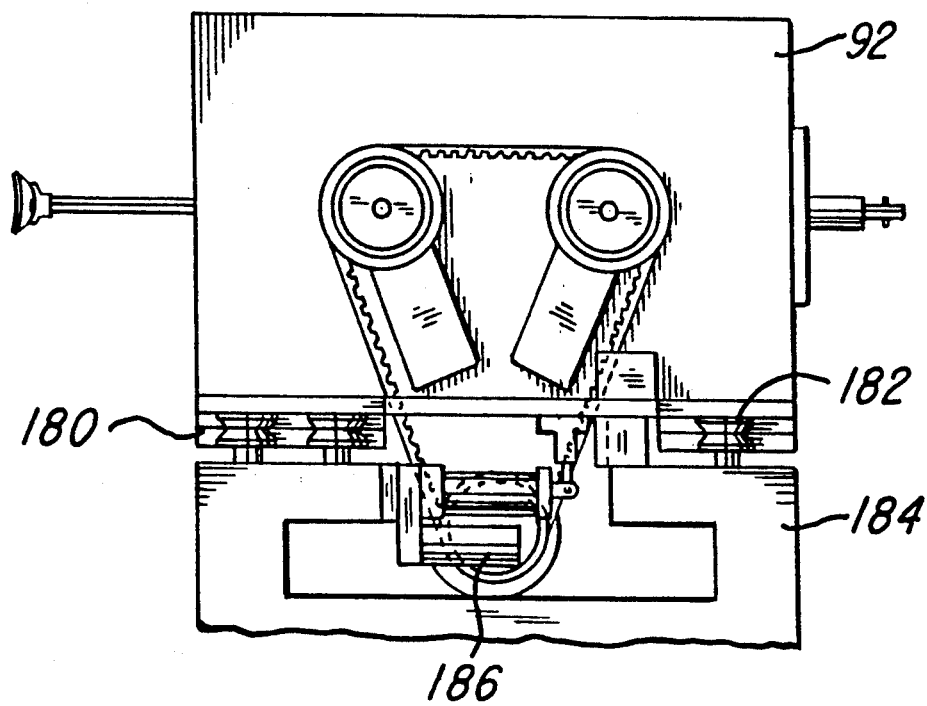
FIG. 15 is a fragmentary, rear elevational view of the programmably adjustable winding head assembly, representing the portion of the machine viewed in the direction of arrows 15—15 of FIG. 1.
Figure 16:
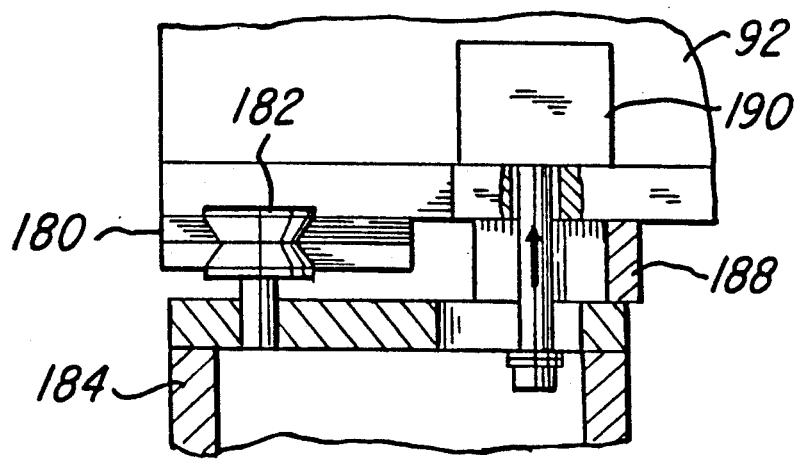
FIG. 16 is an enlarged, fragmentary elevational view showing the manner in which a winding head is clamped to its base.

With reference to FIGS. 1, 15, and 16, also for purposes of adjusting to stators having different stack heights, the winding head 92 has tracks 180 supported by roller elements 182 on a winding machine base 184. The entire winding head 92 may be moved toward and away from the stator, to advantageously adjust the center of the shuttle reciprocation to the center of the stator by means of a suitable drive unit 186. During the movement of the winding head 92, it also slides along a brass clutch member 188 shown in FIG. 16. To clamp the winding head in an adjusted location, a pair of air operated clamps 190 draw the winding head 92 and its base 184 together. The operating parts for moving and clamping the winding head 92 may also be programmably controlled for purposes of quick change over.

FIGS. 17 through 22 illustrate how the wire grippers 84 may be programmably controlled for winding stators having various different lead positioning requirements. The grippers 84 form part of a lead pull assembly, generally designated 208, that comprises upper and lower movable carriages 210 driven by drive screws 212 rotated by a motor 214 and movable along mutually spaced and parallel paths located above and below the axis of oscillation and reciprocation of the winding shuttle 94. The respective drive screws 212 have opposite threads so that the carriages 210 move in mutually opposite, horizontal directions when the drive motor 214 is energized. Each of the carriages 210 rides along a pair of parallel rails 213 and each supports a respective wire gripper assembly, generally designated 215, that includes a first frame 217 fixed to a vertical carriage plate 219. A second frame 220 is vertically mounted on the first frame 217. A first air actuator 216 is mounted on the first frame 217 and has a piston rod 216A that moves the second frame 220 vertically relative to the winding shuttle 94. A second air actuator 218 mounted on the second frame 220 operates to pivotally move a third frame 222 about an axis of rotation relative to the first frame 217, which axis is parallel to the horizontal axis of movement of the carriages 210. The gripper 84 on each carriage 210 is operated by a wire clamp actuator 224 to grip and clamp the lead wires in conventional fashion, each gripper 84 including one blade (not shown) that grips the wire in its grasp and a second blade (not shown) that cuts the wire. The air actuators 216, 218, and 219 are used to control the various movements of the wire grippers 84 as illustrated in FIGS. 18 through 21. The drive screws 212, the parallel rails 213, the motor 214, and the supports therefor are commercially available as a unit, as for example, a unit known as a "rail table" sold by Daedel, Box 500, Harrison City, Pa. 15636.

Because motor 214 is programmable, the lead pull assembly may be used to not only pull start and finish lead but also to pull any number of tap leads. Thus, a tap lead could be inserted into the wire clamp, designated 88A in FIG. 17, intermediate the start and finish wire clamps 88 by suitable programming of the operation of the motor 214. It will also be apparent that additional taps could be connected to the some or different wire clamps using the apparatus of this invention. Here it may be noted that motor 214 may be of any type suitable for use with the type of electronic system used to control the operation of the machine.

Although the presently preferred embodiment of this invention has been described, it will be understood that various modifications may be made within the scope of the following claims.

We claim:

1. Lead pull apparatus for a stator winding machine used to wind field coils onto pole pieces of stators using wires supplied from sources of wire under tension, said lead pull apparatus being used to handle stator coil lead wires and comprising:
    a wire gripper assembly including a movable carriage, a wire gripper mounted on said carriage, and mechanisms on said carriage for moving and operating said wire gripper;
    a drive screw drivingly connected to said carriage for moving said carriage in a horizontal direction to move said wire gripper into positions for gripping and manipulating segments of the wire used to wind coils on stator pole pieces; and
    a programmably controllable drive motor connected to said drive screw for rotatably the same to move said carriage.

2. The apparatus of claim 1 further comprising a second wire gripper assembly including a second movable carriage, a second wire gripper mounted on said second carriage, and mechanisms on said second carriage for moving and operating said second wire gripper;
    a second drive screw drivingly connected to said second carriage for moving said second carriage in a horizontal direction to move said wire ripper into positions for gripping and manipulating segments of a second wire used to wind coils on stator pole pieces; and
    said drive motor being connected to said second drive screw for rotating the same to move said second carriage simultaneously with the movement of said first-mentioned carriage.

3. The apparats of claim 2 wherein said drive screws have mutually parallel axes of rotation.

4. The apparatus of claim 2 wherein said drive motor is so connected to said drive screws that said carriages simultaneously move in mutually opposite directions.

5. For use in winding stators, a method of controlling the operation and position of a pair of wire gripper assemblies used to handle stator coil lead wires, each of said wire gripper assemblies including a carriage, a wire gripper mounted on said carriage, and means on said carriage for manipulating said wire gripper to grip wires extending from coils wound on said stators and place said wires into wire clamps, said method including the steps of driving said pair of wire gripper assemblies along mutually parallel paths utilizing a programmably controllable drive motor to position said wire grippers in locations to grip wires extending from said coils, manipulating said grippers to grip said wires, and moving said wire gripper assemblies and manipulating said wire grippers to insert the gripped wires into selected ones of said clamps.

6. The method of claim 5 wherein said step of driving said pair of wire gripper assemblies along mutually parallel paths utilizing a programmably controllable drive motor comprises moving said gripper assemblies in mutually opposite directions.

7. A method of controlling the operation and position of a wire gripper assembly used to handle stator coil lead wires, said wire gripper assembly including a carriage, a wire gripper mounted on said carriage, and means for manipulating said wire gripper to grip wires extending from coils wound on said stators and place said wires into wire clamps, said method including the steps of driving said wire gripper assembly along a predetermined path utilizing a programmably controllable drive motor to position said wire gripper in locations to grip wires extending from said coils, manipulating said gripper to grip said wires, and moving said wire gripper assembly and manipulating said wire gripper to insert the gripped wires into selected ones of said clamps.

* * * * *